US011579680B2

(12) United States Patent
Wei et al.

(10) Patent No.: US 11,579,680 B2
(45) Date of Patent: Feb. 14, 2023

(54) METHODS AND DEVICES FOR POWER MANAGEMENT BASED ON SYNTHETIC MACHINE LEARNING BENCHMARKS

(71) Applicant: ALIBABA GROUP HOLDING LIMITED, George Town (KY)

(72) Inventors: Wei Wei, San Mateo, CA (US); Lingjie Xu, San Mateo, CA (US); Lingling Jin, San Mateo, CA (US); Wei Zhang, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 1050 days.

(21) Appl. No.: 16/265,934

(22) Filed: Feb. 1, 2019

(65) Prior Publication Data

US 2020/0249740 A1     Aug. 6, 2020

(51) Int. Cl.
| | | |
|---|---|---|
| *G06F 1/00* | (2006.01) | |
| *G06F 1/329* | (2019.01) | |
| *G06N 5/04* | (2023.01) | |
| *G06N 20/00* | (2019.01) | |
| *G06F 1/3206* | (2019.01) | |

(52) U.S. Cl.
CPC .............. *G06F 1/329* (2013.01); *G06N 5/04* (2013.01); *G06N 20/00* (2019.01); *G06F 1/3206* (2013.01)

(58) Field of Classification Search
CPC ................................. G06N 20/00; G06N 5/04
USPC .......................................................... 706/12
See application file for complete search history.

(56) References Cited

U.S. PATENT DOCUMENTS

| | | | |
|---|---|---|---|
| 2011/0239020 A1* | 9/2011 | Thomas ................ | G06F 9/5094 713/323 |
| 2012/0053925 A1* | 3/2012 | Geffin ................... | H05K 7/1498 703/21 |
| 2013/0067261 A1* | 3/2013 | Carroll .................. | G06F 1/3287 713/323 |
| 2016/0302148 A1* | 10/2016 | Buck ..................... | H04L 43/16 |
| 2017/0031430 A1* | 2/2017 | Ansorregui ........... | G06F 1/3287 |
| 2017/0205863 A1* | 7/2017 | Lee ....................... | G06F 1/3206 |
| 2017/0261949 A1* | 9/2017 | Hoffmann ............. | G05B 13/0265 |
| 2017/0279697 A1* | 9/2017 | Katsaros ............... | H04L 41/145 |
| 2018/0025270 A1* | 1/2018 | John ...................... | G06N 20/00 706/25 |
| 2019/0258307 A1* | 8/2019 | Shaikh .................. | G06F 1/3228 |
| 2020/0073469 A1* | 3/2020 | Sadowski ............. | G06F 1/3237 |
| 2020/0191117 A1* | 6/2020 | Li .......................... | H02J 7/0048 |
| 2020/0278738 A1* | 9/2020 | Madar, III ............ | G06F 1/3206 |
| 2021/0391721 A1* | 12/2021 | Ishihara ................ | G05F 1/70 |
| 2022/0108262 A1* | 4/2022 | Celia .................... | G06Q 10/063118 |

* cited by examiner

*Primary Examiner* — Volvick Derose (74) *Attorney, Agent, or Firm* — Finnegan, Henderson, Farabow, Garrett & Dunner, LLP (57) ABSTRACT

A method for power management based on synthetic machine learning benchmarks, including generating a record of synthetic machine learning benchmarks for synthetic machine learning models that are obtained by changing machine learning network topology parameters, receiving hardware information from a client device executing a machine learning program or preparing to execute a machine learning program, selecting a synthetic machine learning benchmark based on the correlation of the hardware information with the synthetic machine learning models, and determining work schedules based on the selected synthetic machine learning benchmark.

18 Claims, 5 Drawing Sheets

Synthetic Machine Learning Benchmark Database
106

Benchmark A
    Power Consumption 1A          Performance Data 1A
    Power Consumption 2A          Performance Data 2A
    ...          ...
    Power Consumption nA          Performance Data nA Benchmark B
    Power Consumption 1B          Performance Data 1B
    Power Consumption 2B          Performance Data 2B
    ...          ...
    Power Consumption nB          Performance Data nB Benchmark C
    Power Consumption 1C          Performance Data 1C
    Power Consumption 2C          Performance Data 2C
    ...          ...
    Power Consumption nC          Performance Data nC

...

Benchmark Z
    Power Consumption 1Z          Performance Data 1Z
    Power Consumption 2Z          Performance Data 2Z
    ...          ...
    Power Consumption nZ          Performance Data nZ

METHODS AND DEVICES FOR POWER MANAGEMENT BASED ON SYNTHETIC MACHINE LEARNING BENCHMARKS

TECHNICAL FIELD

The present disclosure relates to the technical field of power management and, more particularly, to methods and devices for power management based on synthetic machine learning benchmarks.

BACKGROUND

The rise of machine learning is unlocking the potential of data. Many companies have developed machine-learning platforms that derive more meaning out of data. Machine-learning tools are constantly being developed to build more powerful applications in all types of environments. For example, machine learning solutions are not only being implemented in data centers but also are finding their way into user's mobile devices. Machine learning solutions, however, are labor intensive and can consume a substantial amount of power.

With the development of data center servers executing machine learning programs, a user may have difficulties arranging power allocation according to consumption requirements. Inside one server, there are different components, e.g. a CPU, a GPU, storage, a network card, etc. Each of these components have set power limits and all consume power. Because their power requirements change depending on the program being executed and because the total power capacity of the server is fixed, how to allocate power according to consumption requirements is a scheduling problem. Power may be allocated inappropriately, however, resulting in less urgent programs receiving more power than more urgent programs. This inappropriate allocation results in inefficiencies in overall program execution and may lead to longer execution times and higher power consumption.

Furthermore, with the development of mobile devices capable of executing machine learning programs, a user may have difficulties executing machine learning programs on mobile devices with limited battery life. Charging the mobile device when the battery is low may be difficult or impossible. Since there is an increased dependency of users of their mobile devices, there is also a need for better management of battery life on mobile devices. Here, power may also be allocated inappropriately to less urgent programs causing inefficiencies in program execution. These inefficiencies may lead to longer execution times and higher power consumption.

SUMMARY

The present disclosure provides a method for power management based on synthetic machine learning benchmarks. The method includes generating a record of synthetic machine learning benchmarks for synthetic machine learning models that are obtained by changing machine learning network topology parameters, receiving hardware information from a client device executing a machine learning program or preparing to execute a machine learning program, selecting a synthetic machine learning benchmark based on the correlation of the hardware information with the synthetic machine learning models, and determining work schedules based on the selected synthetic machine learning benchmark.

Consistent with some embodiments, the present disclosure also provides a device for power management based on synthetic machine learning benchmarks. The device includes a memory configured to store a set of instructions and a processor configured to execute the set of instructions to cause the device to: generate a record of synthetic machine learning benchmarks for synthetic machine learning models that are obtained by changing machine learning network topology parameters, receive hardware information from a client device executing a machine learning program or preparing to execute a machine learning program, select a synthetic machine learning benchmark based on the correlation of the hardware information with the synthetic machine learning models, and determine work schedules based on the selected synthetic machine learning benchmark.

Consistent with some embodiments, the present disclosure further provides a non-transitory computer-readable medium that stores a set of instructions executable by at least one processor of a device for power management based on synthetic machine learning benchmarks to cause the device to perform a method for power management based on synthetic machine learning benchmarks. The method includes generating a record of synthetic machine learning benchmarks for synthetic machine learning models that are obtained by changing machine learning network topology parameters, receiving hardware information from a client device executing a machine learning program or preparing to execute a machine learning program, selecting a synthetic machine learning benchmark based on the correlation of the hardware information with the synthetic machine learning models, and determining work schedules based on the selected synthetic machine learning benchmark.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In conventional systems with datacenter servers, the servers have limited power capacity. The power requirements of the different components of the server change depending on what program is being executed. Additionally, datacenter workloads are conventionally training oriented. Therefore, in order to maximize efficiency in a datacenter executing a machine learning program, a scheduling scheme is required to control the overall power consumption of the program as well as the individual power consumptions of the various server components. If a program is not urgent, its power consumption can be limited or lowered and the spare power can be passed to other programs executing on the CPU, GPU, or storage. Additionally, if one program's efficiency will suffer less from a restriction of power than another program, power may be allocated from the first program to the second, resulting in greater overall efficiency. Moreover, if power can be allocated from programs currently executing without suffering a significant loss of efficiency, additional programs may be executed concurrently leading to greater overall efficiency. The overall goal is to reduce power consumption and improve efficiency through the scheduling scheme.

Furthermore, in conventional systems with mobile devices, the mobile devices have limited battery life. Mobile device workloads increasingly consist of mostly inference based tasks. Machine learning programs may execute many inference programs on daily tasks, taking up valuable battery life. Users may find it inconvenient or impossible to charge their mobile devices. Therefore, in order to maximize efficiency in mobile devices executing machine learning programs, a scheduling scheme is used to control the power consumptions of the programs. If a program is not urgent, its power consumption can be limited, lowered, or cut off completely. The spare power can then either be passed to another program or retained to extend the battery life of the mobile device. Additionally, if one program's efficiency will suffer less from a restriction of power than another program, power may be allocated from the first program to the second, resulting in greater overall efficiency. Moreover, if power can be allocated from programs currently executing without suffering a significant loss of efficiency, additional programs may be executed concurrently leading to greater overall efficiency. The overall goal is to achieve high throughput and low latency while reducing overall power consumption.

Embodiments of the present disclosure are directed to methods and devices for power management based on synthetic machine-learning benchmarks. For example and without limitation, embodiments of the present disclosure may include a device connected to a synthetic benchmark database and also connected to a client device, e.g. a data center server or mobile device executing one or more machine learning programs. The device may generate a number of synthetic machine learning models based on a number of variables, e.g. input size, filter size, number of filters, stride of filters, and number of layers. In some embodiments, the device may generate tens of thousands of synthetic machine learning models based off of many different permutations of these variables.

According to embodiments of the present disclosure, the device may then change the power consumption allocated for each of the synthetic machine learning models and generate performance data based on these power consumptions. In some embodiments, this performance data may be the time the synthetic machine learning model takes to execute, the accuracy of the outputs of the synthetic machine learning model, or other indicators of performance.

The device may then store the performance data and the associated power consumptions in a synthetic benchmark database to access later. In some embodiments, the performance data and associated power consumptions, known together as operation information, may be stored in sets based on the synthetic machine learning model with which they are associated. These sets of operation information each correspond with one of the synthetic machine learning models and are collectively referred to as a synthetic machine learning benchmark.

The device may then receive hardware information from a client device (e.g. a data center server or mobile device) executing one or more machine learning programs. In some embodiments, this hardware information may be hardware metrics recorded by the client device in response to the client device executing the one or more machine learning programs. In some embodiments, the hardware information may be a copy of the machine learning program being executed. In some embodiments, these hardware metrics many include layer information of the machine learning program being executed, how many watts are used during the execution of the program, how many instructions are executed during the execution of the program, how much memory is used during execution of the program, and other similar parameters.

The device may then analyze the received hardware information. In some embodiments, this analysis is used to extract predictions of the machine learning program based on received hardware metrics. For example, the device may analyze layer information of the machine learning program that was executed, how many watts were used during the execution of the program, how many instructions were executed during the execution of the program, how much memory was used during execution of the program, and other similar parameters to predict the underlying machine learning model.

The device may then correlate the hardware information with one of the synthetic machine learning models. In some embodiments, the device uses a statistical correlation method to correlate the machine learning program that was executed on the client device with one of the synthetic machine learning models. For example, the device may compare the layer parameter statistical distribution, Multiple-Accumulate operations (MAC), and other similar parameters of the predicted machine learning program which was executed with each of the synthetic machine learning models to find the synthetic machine learning model with the highest correlation to the predicted machine learning program.

The device may then select a synthetic machine learning benchmark based on the correlation of hardware information with one of the synthetic machine learning models. In some embodiments, the synthetic machine learning benchmark is the machine learning benchmark corresponding with the machine learning model that has the highest correlation to the predicted machine learning program.

The device may then determine work schedules for the client device based on the selected machine learning benchmark. In some embodiments, the device is able to provide work schedules for different power consumptions so that the user of the client device may decide which work schedule to use.

Figure 1:
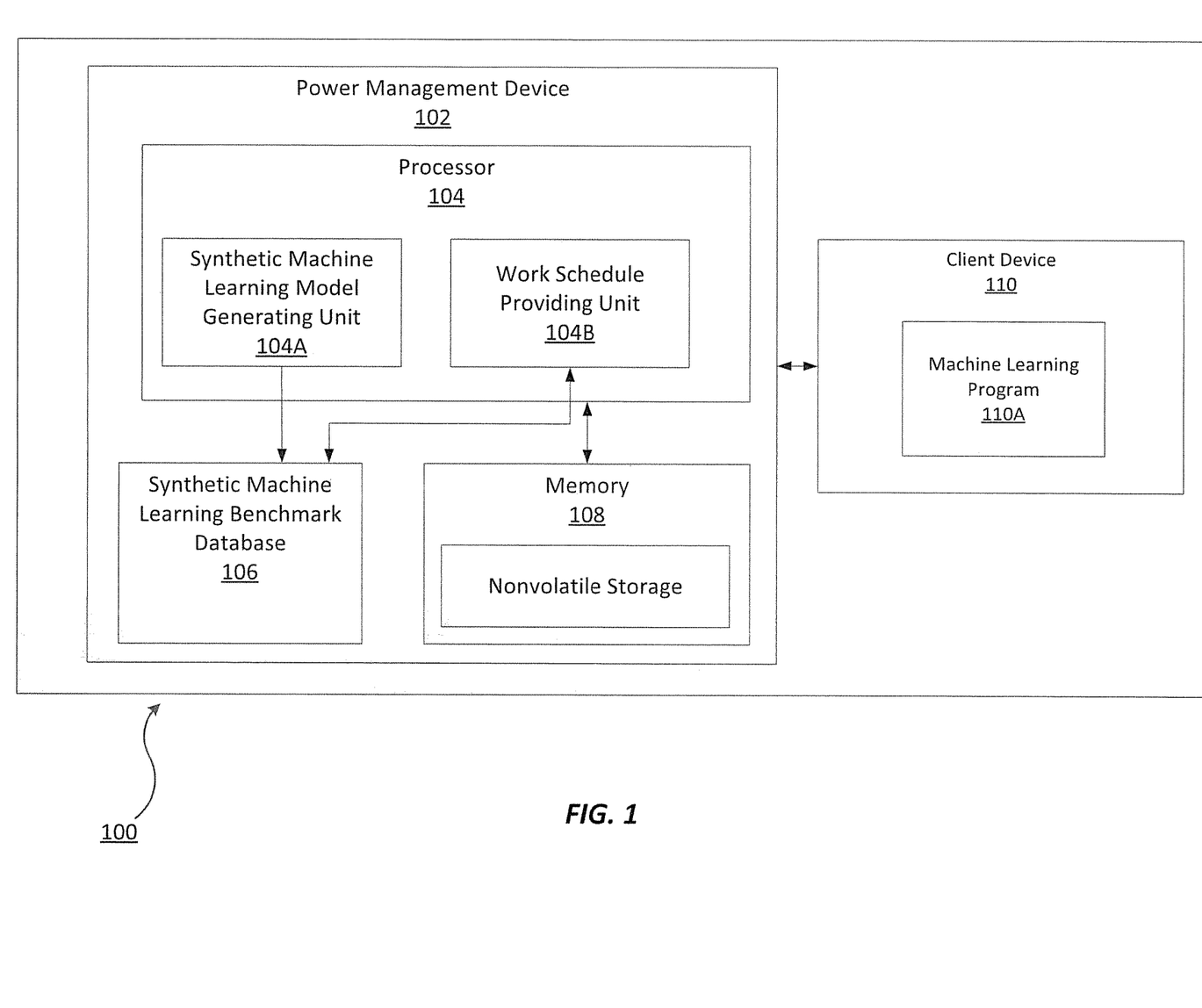
FIG. 1 illustrates an exemplary system environment for implementing methods and devices for power management based on synthetic machine-learning benchmarks, consistent with some embodiments of this disclosure.

FIG. 1 illustrates an exemplary system environment 100 for implementing methods and devices for power management based on synthetic machine learning benchmarks, consistent with some embodiments of this disclosure. System environment 100 may include, for example, a power management device 102 for power management based on synthetic machine learning benchmarks. As shown in FIG. 1, system environment 100 comprises a power management device 102 having a processor 104, a synthetic machine learning benchmark database 106, and a memory 108.

As shown in FIG. 1, in some embodiments, system 100 can include client device 110 running a machine learning program 110A. Client device 110 can provide hardware information to power management device 102 via a communication interface (not shown), such as a network interface card.

In some embodiments, processor 104 can include one or more processors involved with power management based on synthetic machine learning benchmarks. Processor can include a synthetic machine learning model generating unit 104A and a work schedule providing unit 104B. Synthetic machine learning model generating unit 104A may change machine learning network topology parameters to generate synthetic machine learning models such as those shown in FIGS. 2A-2I. Additionally, synthetic machine learning model generating unit 104A may change power consumptions for the generated synthetic machine learning models such as those shown in FIGS. 2A-2I. Synthetic machine learning model generating unit 104A may then generate performance data for each power consumption and each synthetic machine learning model and store the power consumptions and performance data in the synthetic machine learning model benchmark database 106. Synthetic machine learning model generating unit 104A may store the power consumptions and performance data in pairs, referred to as operation information. A set of operation information associated with a single machine learning model is referred to as a synthetic machine learning benchmark, such as those shown in FIG. 3.

Work schedule providing unit 104E may receive hardware information from client device 110, wherein the hardware information comprises information associated with client device 110 executing machine learning program 110A. Work schedule providing unit 104B may then analyze that hardware information and correlate the hardware information with a synthetic machine learning model. Using the correlation of the hardware information with a synthetic machine learning model, work schedule providing unit 104B may then select a synthetic machine learning benchmark. Work schedule providing unit 104B may then determine work schedules based on the selected synthetic machine learning benchmark. In some embodiments, work schedule providing unit 104B may then send the determined work schedules to client device 110.

Figure 2A:
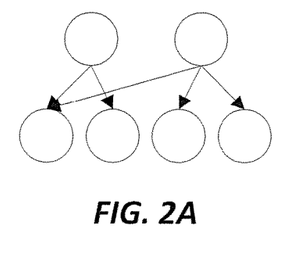
FIGS. 2A-2I are diagrams of exemplary synthetic machine-learning models, consistent with some embodiments of this disclosure.
Figure 2B:
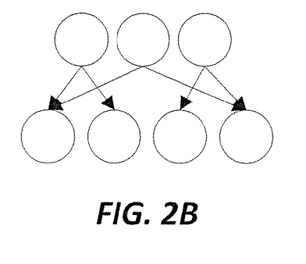
Figure 2C:
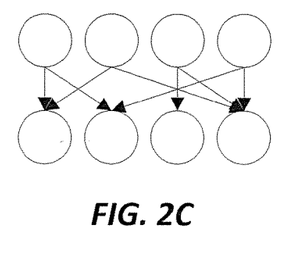
Figure 2D:
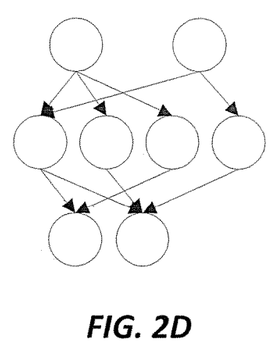
Figure 2E:
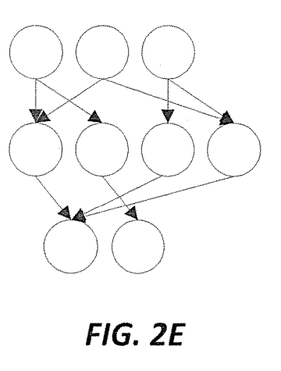
Figure 2F:
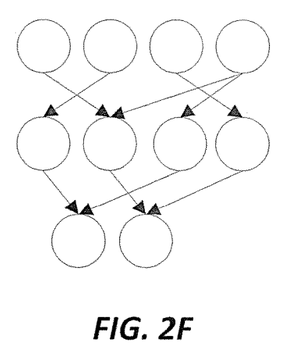
Figure 2G:
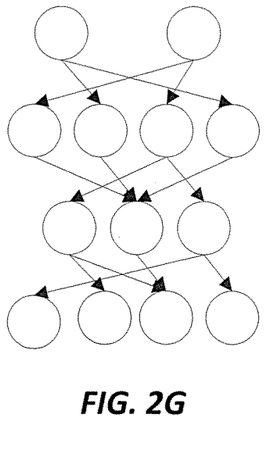
Figure 2H:
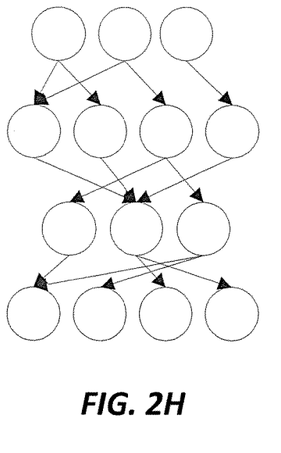
Figure 2I:
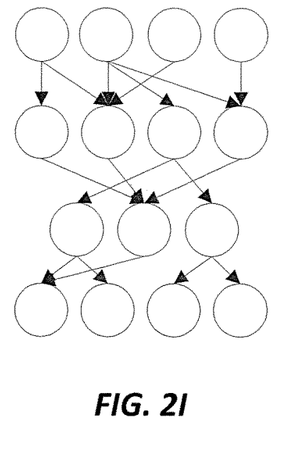

FIGS. 2A-2I are diagrams of exemplary synthetic machine learning models that may be generated by the synthetic machine learning model generating unit 104A. These diagrams are for exemplary purposes only and the actual exemplary synthetic machine learning models may number in the tens of thousands. As shown in FIGS. 2A-2I, the exemplary synthetic machine learning models may have different input sizes and different numbers of layers. For example, one synthetic machine learning model, as shown in FIG. 2A, may have two inputs, two layers, and a designated filter size, number of filters, and stride of filters. Another synthetic machine learning model, as shown in FIG. 2F may have four inputs, three layers, and a designated filter size, number of filters, and stride of filters. Still another synthetic machine learning model, as shown in FIG. 2H, may have three inputs, four layers, and a designated filter size, number of filters, and stride of filters. Many different models may be generated with every possible permutation of these variables. The synthetic model generating unit 104A generates models based on a variety of different input sizes, filter sizes, number of filters, stride of filters, and number of layers. These machine learning models will be correlated with machine learning program 110A running on client device 110. Each of these machine learning models corresponds with a machine learning benchmark, such as the machine learning benchmarks in FIG. 3. As shown in FIGS. 2A-2I, the exemplary models only show different input sizes and number of layers. In embodiments, however, each of FIGS. 2A-2I would be replicated with differing filter sizes, number of filters, and strides of filters.

Figure 3:
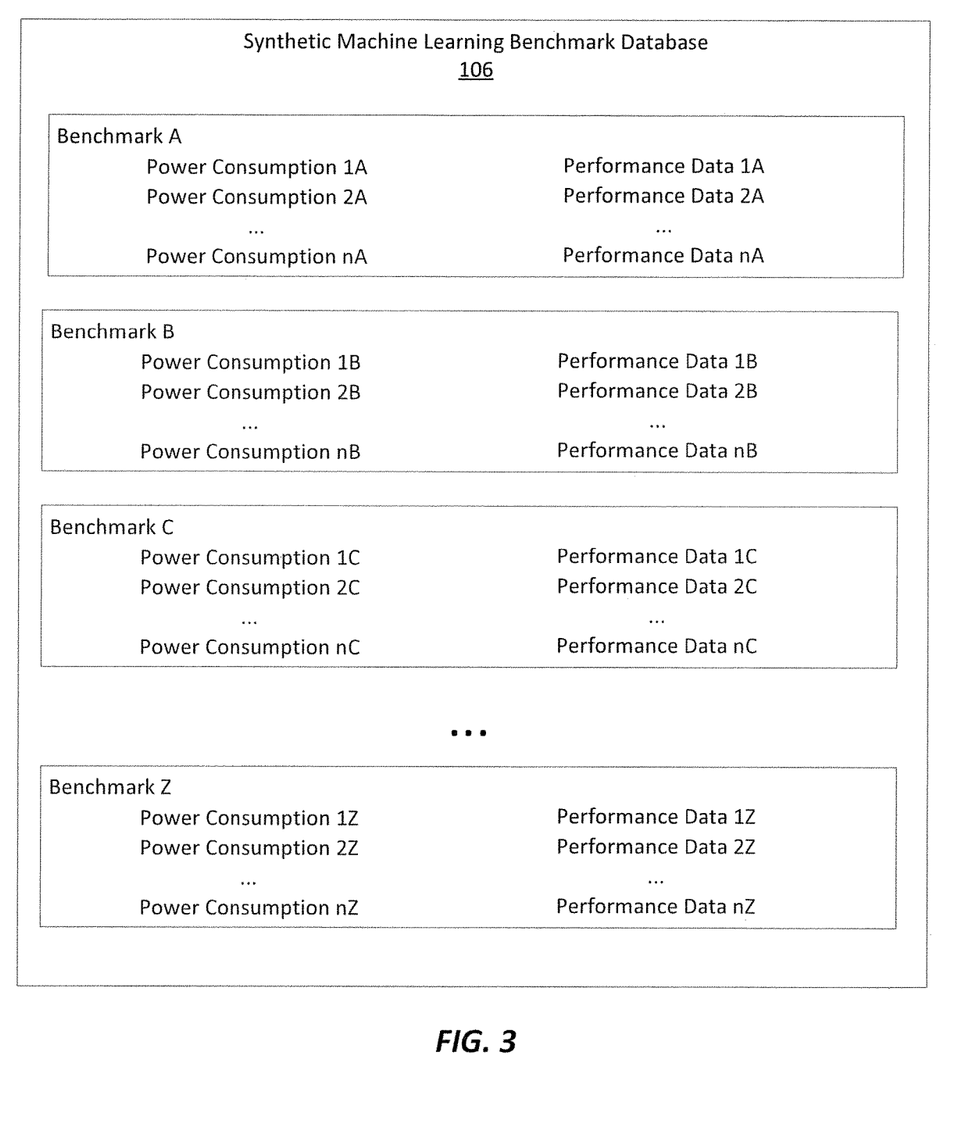
FIG. 3 is a diagram of an exemplary synthetic benchmark database, consistent with some embodiments of this disclosure.

FIG. 3 is a diagram of an exemplary synthetic machine learning benchmark database 106, consistent with some embodiments of this disclosure. As shown in FIG. 3, the database stores different power consumptions and performance data for each of the synthetic machine learning models, such as the synthetic machine learning models shown in FIGS. 2A-2I. For example, the synthetic machine learning model generating unit 104A would simulate the execution of a synthetic machine learning model, such as the one shown in FIG. 2A for a given power consumption 1A. Synthetic machine learning model generating unit 104A may then generate performance data 1A corresponding to the synthetic machine learning model's simulated performance under the given power consumption 1A. In some embodiments, synthetic machine learning model generating unit 104A may then store performance data 1A and power consumption 1A in a region of the synthetic machine learning benchmark database 106, such as the region designated benchmark A. The region of the synthetic machine learning benchmark database 106 designated benchmark A corresponds with a synthetic machine learning model, such as the one shown in FIG. 2A.

In some embodiments, synthetic machine learning model generating unit 104A would then change the power consumption for the same synthetic machine learning model, such as the one shown in FIG. 2A, to a new power consumption 2A. In some embodiments, synthetic machine learning model generating unit 104A may then simulate the execution of the synthetic machine learning model, such as the one shown in FIG. 2A for the new power consumption 2A. Synthetic machine learning model generating unit 104A may then generate performance data 2A corresponding to the synthetic machine learning model's simulated performance under the given power consumption 2A. In some embodiments, synthetic machine learning model generating unit 104A may then store performance data 2A and power consumption 2A in the region of the synthetic machine learning benchmark database 106, such as the region designated benchmark A. In some embodiments, synthetic machine learning model generating unit 104A may then repeat this process for all available power consumptions 3A through nA and simulate the execution of the synthetic machine learning model, such as the one shown in FIG. 2A for all the power consumptions. Synthetic machine learning model generating unit 104A may then generate corresponding performance data 3A through nA. This collection of power consumptions 1A through nA, coupled with the associated performance data 1A through nA, forms benchmark A, which is associated with one synthetic machine learning model, such as the one shown in FIG. 2A. In some embodiments, synthetic machine learning model generating unit 104A may then store performance data 3A through nA and power consumption 3A through nA in a region of the synthetic machine learning benchmark database 106, such as the region designated benchmark A.

As shown in FIG. 3, this process can be repeated for all of the synthetic machine learning models, such as the ones shown in FIGS. 2A-2I. Each synthetic machine learning model is thus paired with a corresponding benchmark and a variety of power consumptions and corresponding performance data is stored for each one. In some embodiments, synthetic machine learning model generating unit 104A may then store this data in the synthetic machine learning benchmark database 106 for later processing.

Figure 4:
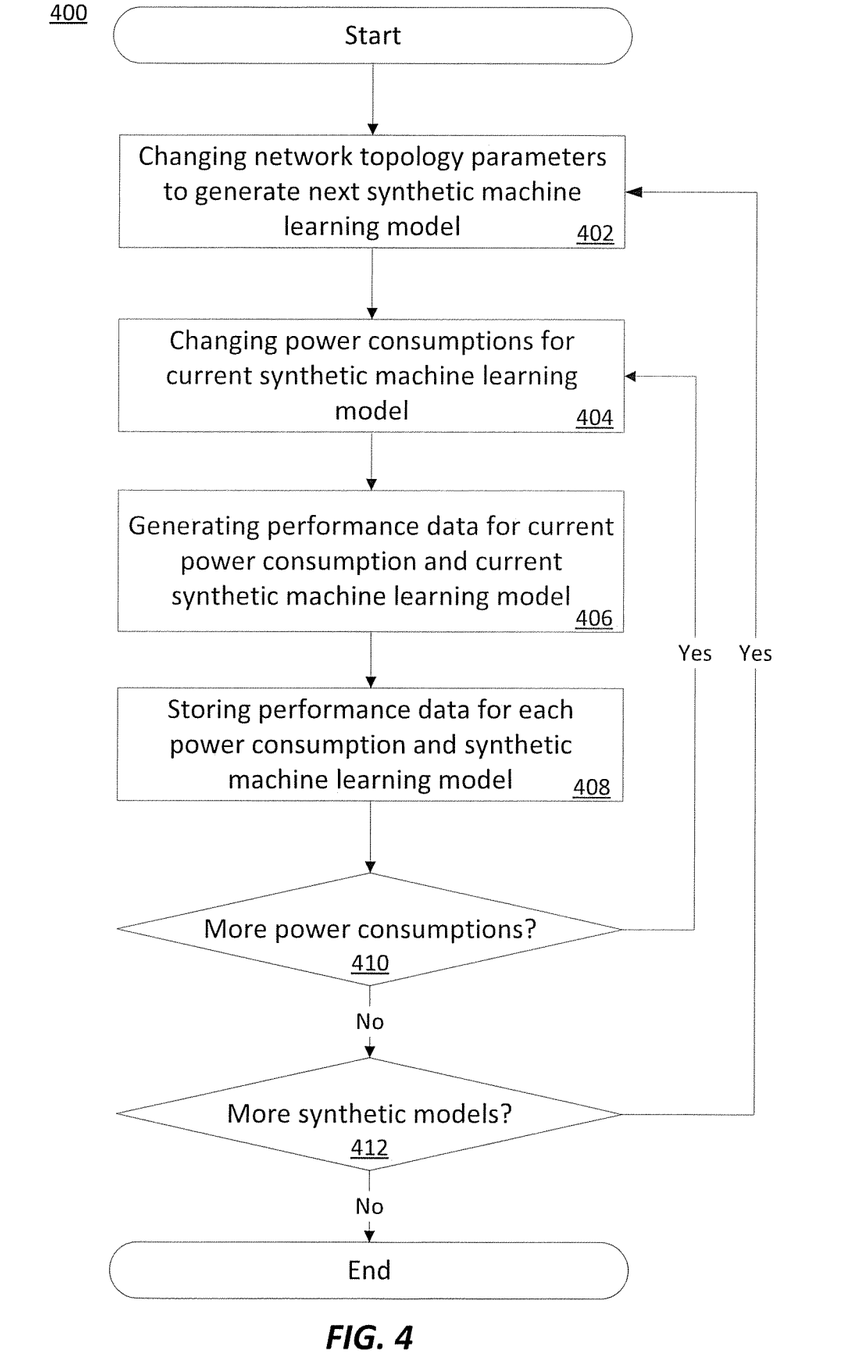
FIG. 4 is a flowchart of an exemplary method for power management based on synthetic machine-learning benchmarks, consistent with some embodiments of this disclosure.

FIG. 4 is a flowchart of an exemplary method 400 for power management based on synthetic machine learning benchmarks, consistent with some embodiments of this disclosure. The exemplary method 400 may be performed by a device (e.g., power management device 102 having processor 104 of FIG. 1).

In step 402, the power management device changes network topology parameters to generate next the synthetic machine learning model, such as the synthetic machine learning models shown in FIGS. 2A-2I. For example, the power management device can generate a number of synthetic machine learning models based on different input sizes, filter sizes, number of filters, stride of filters, and number of layers. Each of these synthetic machine learning models can therefore be unique and have at least one of these parameters distinct from the other synthetic machine learning models. During this step, the power management device may generate a single synthetic machine learning model or may generate tens of thousands of synthetic models or more based on the different parameters listed above.

In step 404, the power management device changes the power consumption for the current synthetic machine learning model. For example, the power management device changes between different power consumptions of the client device for the current synthetic machine learning model chosen in step 402.

In some embodiments, these power consumptions may be represented as percentages where 100% represents allowing full power from the client device, 90% would then represent using only 90% of the full power from the client device and so on. These power consumptions may also be represented as their absolute values, such as 250 Watts per hour. For each synthetic machine learning model, the power management device may use a variety of these power consumptions.

In step 406, the power management device generates performance data for the current power consumption and the current synthetic machine learning model. For example, the power management device can simulate the current synthetic machine learning model chosen in step 402 using the current power consumption chosen in step 404. The results are the performance data determining how the synthetic machine learning model performed under the power constraints of the current power consumption. In some embodiments this performance data may be the time the synthetic machine learning model takes to run, the accuracy of the outputs of the synthetic machine learning model, and other indicators of performance.

In step 408, the power management device stores the performance data for each power consumption and synthetic machine learning model. For example, the power management device may store the performance data from step 406 that was generated based on the current synthetic machine learning model chosen in step 402 and the current power consumption chosen in step 404.

In some embodiments, the power management device may store this performance data along with an identifier of the associated synthetic machine learning model and the associated power consumption in a synthetic benchmark database 106. For example, the performance data and power consumptions may be stored in a region of the synthetic machine learning benchmark database 106 labeled benchmark A, as shown in FIG. 3. The region of the synthetic machine learning benchmark database 106 labeled benchmark A corresponds with one of the synthetic machine learning models, such as the synthetic machine learning models shown in FIGS. 2A-2I. Over many iterations of this process, the synthetic machine learning benchmark database (e.g., synthetic machine learning benchmark database 106) may be filled with a variety of synthetic machine learning benchmarks, such as benchmarks A through Z shown in FIG. 3, each representing a single synthetic machine learning model, such as the one chosen in step 402. Each of these synthetic machine learning benchmarks contains a variety of power consumptions, as explained in step 404 that are each associated with performance data, as explained in step 406.

In step 410, the power management device determines whether there are more power consumptions to cycle through for the given synthetic machine learning model. For example, the power management device may determine that there are no more power consumptions to cycle through when the power management device has calculated performance data for a certain number of power consumptions, such as the n power consumptions shown in FIG. 3. In some embodiments, the number of power consumptions per synthetic machine learning model may be preset and stored in a memory (e.g., memory 108). In some embodiments, the number of power consumptions may be determined based on the current synthetic machine learning model determined in step 402.

In some embodiments, if power management device determines that there are more power consumptions to cycle through for the given synthetic machine learning model, then power management device may proceed to step 404 and continue from there.

In some embodiments, the power management device performs the entire method 400 in mass and there is no need for iterating through each synthetic machine learning model and power consumption. For example, the power management device may generate all the synthetic machine learning models in step 402. The power management device may then change power consumptions for each machine learning model and generate performance data based on the power consumptions and the given synthetic machine learning model. The power management device may then store all of the performance data along with the associated power consumption and an identifier of the associated synthetic machine learning model.

In step 412, the power management device determines whether there are more synthetic machine learning models to cycle through. For example, the power management device may determine that there are no more synthetic machine learning models to cycle through when the power management device generates a certain number of synthetic machine learning models.

In some embodiments the number of synthetic machine learning models to generate, representing permutations of the variables identified in step 402, may be preset and stored in the memory. In some embodiments, there may be a preset number of values for each variable identified in step 402. For example, the power management device may only generate synthetic machine learning models with one, two, three, or four layers (although it is appreciated that more layers could be used), and when synthetic machine learning models representing all permutations of the other variables for the given numbers of layers are generated, then the power management device may determine that there are no more synthetic machine learning models to cycle through.

Figure 5:
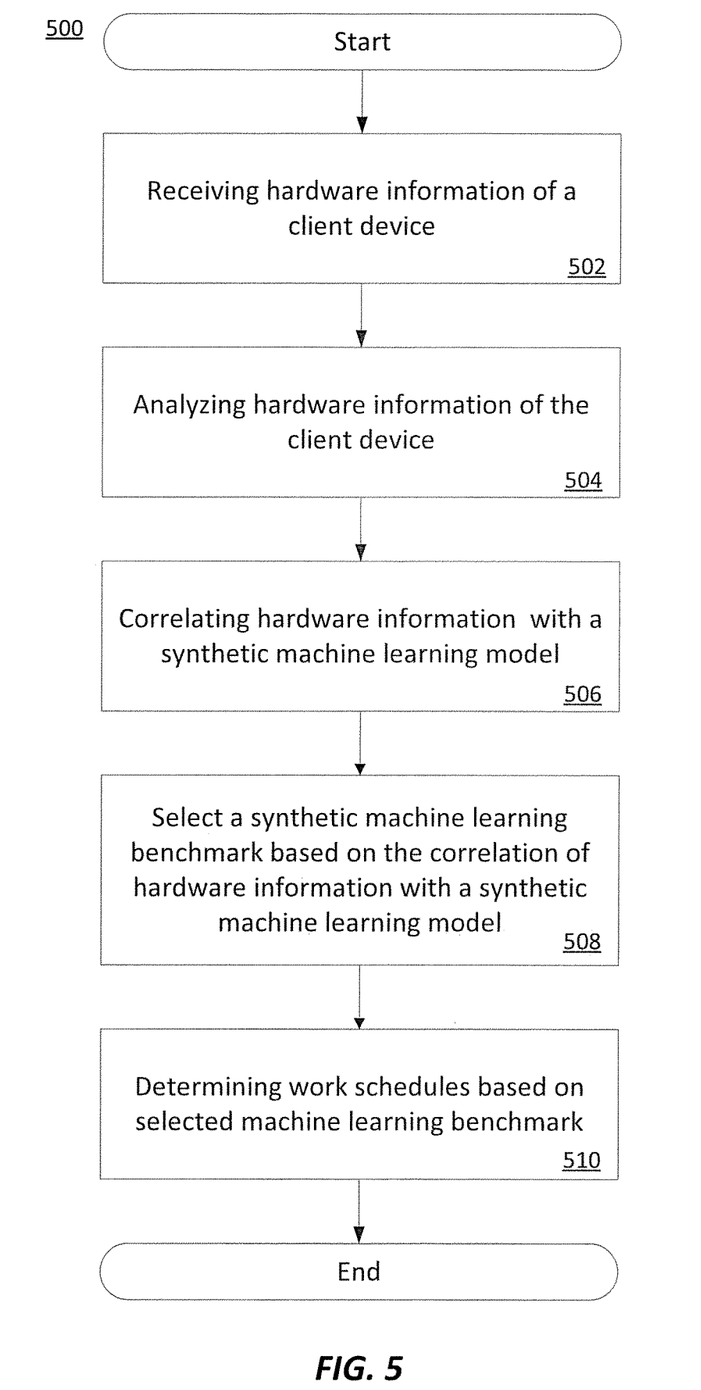
FIG. 5 is a flowchart of another exemplary method for power management based on synthetic machine learning benchmarks, consistent with some embodiments of this disclosure.

In some embodiments, if it is determined that there are more synthetic machine learning models to generate, then the method 400 may proceed to step 402 and continue from there. FIG. 5 is a flowchart of an exemplary method 500 power management based on synthetic machine learning benchmarks, consistent with some embodiments of this disclosure. The exemplary method 500 may be performed by a device (e.g., power management device 102 having processor 104 of FIG. 1).

In step 502, the power management device receives hardware information of a client device (e.g., client device 110). The power management device may or may not receive the hardware information from client device in response to a request from the power management device. In some embodiments, this hardware information may be hardware metrics recorded by the client device in response to the client device running a machine learning program.

In some embodiments, these hardware metrics many include information about the layers of machine learning program (e.g., machine learning program 110A), how many watts were used during the execution of the program, how many instructions were executed during the execution of the program, how much memory was used during execution of the program, information about power limits of the individual components of client device, a copy of the machine learning program, and other similar parameters.

In step 504, the power management device analyzes the hardware information received from client device. For example, the power management device may analyze information about the layers of machine learning program, how many watts were used during the execution of the program, how many instructions were executed during the execution of the program, how much memory was used during execution of the program, information about the power limits of the individual components of client device, a copy of the machine learning program, and other similar parameters to predict the underlying machine learning model.

In step 506, the power management device correlates the hardware information with a synthetic machine learning model. Power management device may use the results of the analysis from step 504 to determine the model of machine learning program. The power management device may then use some statistical correlation method to correlate the determined model of machine learning program with a synthetic machine learning model, such as the models shown in FIGS. 2A-2I. For example, the power management device may compare the layer parameter statistical distribution, Multiply-Accumulate operations (MAC), or other similar parameters between the determined model of machine learning program and the synthetic machine learning models generated in step 402 of FIG. 4.

In step 508, the power management device selects a synthetic machine learning benchmark from a synthetic machine learning benchmark database (e.g., synthetic machine learning benchmark database 106) based on the correlation of the hardware information with a synthetic machine learning model. For example, the power management device 102 may select a synthetic machine learning benchmark by analyzing the synthetic machine learning benchmark stored in machine learning benchmark database corresponding with the synthetic machine learning model with the highest correlation to the determined model of machine learning program determined in step 506. In some embodiments, the power management device may then predict that at a given power consumption, the program will have associated performance data.

In step 510, the power management device determines work schedules based on the selected machine learning benchmark. The power management device may determine work schedules for the client device based on the performance predicted in step 506. For example, the power management device may determine that the efficiency of machine learning program would not be greatly affected from reducing power consumption. This information would then be reflected in the work schedules with less power being allocated to machine learning program 110A.

In some embodiments, the power management device may use the predicted performance of other programs being run on client device to calculate the work schedules. For example, if the predicted performance of a first machine learning program would be more harmed by power reduction than the predicted performance of a second machine learning program, then the work schedule would allocate less power to the second machine learning program, thus achieving maximum efficiency.

In some embodiments, a non-transitory computer-readable storage medium including instructions is also provided, and the instructions may be executed by a device (such as a terminal, a personal computer, or the like), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for power management based on synthetic machine learning benchmarks, comprising:
   generating a record of synthetic machine learning benchmarks for synthetic machine learning models that are obtained by changing machine learning network topology parameters, wherein generating the record of synthetic machine learning benchmarks for synthetic machine learning models comprises:
      generating synthetic machine learning models based on controlling input size, filter size, number of filters, stride of filters, and number of layers of models, and
      obtaining performance data for each generated synthetic machine learning model based on each of the generated synthetic machine learning models and a power consumption associated with each of the generated synthetic machine learning network models;
   receiving hardware information from a client device executing a machine learning program or preparing to execute a machine learning program;
   selecting a synthetic machine learning benchmark based on the hardware information and the synthetic machine learning models; and
   determining a work schedule for the client device based on the selected synthetic machine learning benchmark.

2. The method of claim 1, wherein selecting a synthetic machine learning benchmark based on the hardware information and the synthetic machine learning models comprises analyzing the hardware information received from the client device and correlating the hardware information with the synthetic machine learning models based on the analysis of the hardware information.

3. The method of claim 2, wherein analyzing hardware information received from the client device comprises predicting a machine learning model based on the hardware information.

4. The method of claim 2, wherein correlating hardware information with the synthetic machine learning models comprises comparing the results of the analysis of the hardware information with the generated synthetic machine learning models.

5. The method of claim 1, wherein the received hardware information comprises at least one of:
   a power consumption measurement of the client device;
   an executable instruction measurement of the client device;
   layer information of the machine learning program being executed on the client device;
   power limits of components of the client device; or
   a memory usage measurement of the client device.

6. The method of claim 1, wherein selecting the synthetic machine learning benchmark comprises choosing the machine learning benchmark from the record that corresponds with the machine learning model that correlates best with results of the analysis of the hardware information.

7. A device for power management based on synthetic machine learning benchmarks, comprising:
   a memory configured to store a set of instructions; and
   a processor configured to execute the set of instructions to cause the device to:
      generate a record of synthetic machine learning benchmarks for synthetic machine learning models that are obtained by changing machine learning network topology parameters, wherein generation of the record of synthetic machine learning benchmarks for synthetic machine learning models comprises:
         generate synthetic machine learning models based on controlling input size, filter size, number of filters, stride of filters, and number of layers of models, and
         obtain performance data for each generated synthetic machine learning model based on each of the generated synthetic machine learning models and a power consumption associated with each of the generated synthetic machine learning network models;
      receive hardware information from a client device executing a machine learning program or preparing to execute a machine learning program;
      select a synthetic machine learning benchmark based on the correlation of the hardware information with the synthetic machine learning models; and
      determine work schedules based on the selected synthetic machine learning benchmark.

8. The device of claim 7, wherein selecting a synthetic machine learning benchmark based on the hardware information and the synthetic machine learning models comprises analyzing the hardware information received from the client device and correlating the hardware information with the synthetic machine learning models based on the analysis of the hardware information.

9. The device of claim 8, wherein analyzing hardware information received from the client device comprises predicting a machine learning model based on the hardware information.

10. The device of claim 8, wherein correlating hardware information with the synthetic machine learning models comprises comparing the results of the analysis of the hardware information with the generated synthetic machine learning models.

11. The device of claim 7, wherein the received hardware information comprises at least one of:
- a power consumption measurement of the client device;
- an executable instruction measurement of the client device;
- layer information of the machine learning program being executed on the client device;
- power limits of components of the client device; and/or
- a memory usage measurement of the client device.

12. The device of claim 7, wherein selecting a synthetic machine learning benchmark comprises choosing the machine learning benchmark from the record that corresponds with the machine learning model that correlates best with results of the analysis of the hardware information.

13. A non-transitory computer-readable medium that stores a set of computer executable instructions that are executable by at least one processor of a device for power management to cause the device to perform a method for power management based on synthetic machine learning benchmarks, the method comprising:
- generating a record of synthetic machine learning benchmarks for synthetic machine learning models that are obtained by changing machine learning network topology parameters, wherein generating the record of synthetic machine learning benchmarks for synthetic machine learning models comprises:
  - generating synthetic machine learning models based on controlling input size, filter size, number of filters, stride of filters, and number of layers of models, and
  - obtaining performance data for each generated synthetic machine learning model based on each of the generated synthetic machine learning models and a power consumption associated with each of the generated synthetic machine learning network models;
- receiving hardware information from a client device executing a machine learning program or preparing to execute a machine learning program;
- selecting a synthetic machine learning benchmark based on the correlation of the hardware information with the synthetic machine learning models; and
- determining work schedules based on the selected synthetic machine learning benchmark.

14. The computer readable medium according to claim 13, wherein selecting a synthetic machine learning benchmark based on the hardware information and the synthetic machine learning models comprises analyzing the hardware information received from the client device and correlating the hardware information with the synthetic machine learning models based on the analysis of the hardware information.

15. The computer readable medium according to claim 14, wherein analyzing hardware information received from the client device comprises predicting a machine learning model based on the hardware information.

16. The computer readable medium according to claim 14, wherein correlating hardware information with the one or more synthetic machine learning models comprises comparing the results of the analysis of the hardware information with the generated machine learning models.

17. The computer readable medium according to claim 13, wherein the received hardware information comprises at least one of:
- a power consumption measurement of the client device;
- an executable instruction measurement of the client device;
- layer information of the machine learning program being executed on the client device;
- power limits of components of the client device; and/or
- a memory usage measurement of the client device.

18. The computer readable medium according to claim 13, wherein selecting a synthetic machine learning benchmark comprises choosing the machine learning benchmark from the record that corresponds with the machine learning model that correlates best with results of the analysis of the hardware information.

* * * * *